US012601720B2

(12) United States Patent
Liao et al.

(10) Patent No.: US 12,601,720 B2
(45) Date of Patent: Apr. 14, 2026

(54) LIVE-COLUMN VISUALIZATION CHROMATOGRAPHY FOR SEPARATION OF COMPOUNDS

(71) Applicants: Junzhuo Liao, Stony Brook, NY (US); Robert William Weir, Canon City, CO (US); Xiao Yu, Stony Brook, NY (US); Zhanjun Luo, Lyman, WY (US)

(72) Inventors: Junzhuo Liao, Stony Brook, NY (US); Robert William Weir, Canon City, CO (US); Xiao Yu, Stony Brook, NY (US); Zhanjun Luo, Lyman, WY (US)

(73) Assignee: AAdvance Instruments, LLC, Stony Brook, NY (US)

( * ) Notice: Subject to any disclaimer, the term of this patent is extended or adjusted under 35 U.S.C. 154(b) by 185 days.

(21) Appl. No.: 18/197,282

(22) Filed: May 15, 2023

(65) Prior Publication Data

US 2024/0385150 A1     Nov. 21, 2024

(51) Int. Cl.
G01N 30/60          (2006.01)
G01N 30/32          (2006.01)
G01N 30/50          (2006.01)
G01N 30/74          (2006.01)

(52) U.S. Cl.
CPC ......... G01N 30/6082 (2013.01); G01N 30/32 (2013.01); G01N 30/50 (2013.01); G01N 30/74 (2013.01); *G01N 2030/328* (2013.01)

(58) Field of Classification Search
None
See application file for complete search history.

(56) References Cited

U.S. PATENT DOCUMENTS 3,692,669 A * 9/1972 Bauman ............. G01N 30/6082
                                                  210/656
4,235,716 A * 11/1980 Halpaap ................... B01J 20/08
                                                  210/198.2

(Continued)

FOREIGN PATENT DOCUMENTS

CN        202185180 U  *  4/2012
CN        216911509 U  *  7/2022
KR        100444150 B1 *  8/2004   ......... G01N 30/6052

*Primary Examiner* — Daniel S Larkin
(74) *Attorney, Agent, or Firm* — The Rapacke Law Group, P.A.

(57) ABSTRACT

A system for live compound visualization in column chromatography separation of compounds, including a shortwave UV transparent column configured to receive a crude mixture to be separated with an eluting solvent; a sorbent that is homogenously premixed with an inorganic UV indicator, wherein the fluorescent sorbent can be washed in-place and reusable; a shortwave UV light source that satisfies the following regarding its wavelength: 1) creates fluorescence on the inorganic UV indicator, 2) does not get absorbed by the eluting solvent, and 3) gets absorbed by the compounds; a detachable flow control valve rigidly fitted to an outlet end of the shortwave UV transparent column; a nozzle to the flow control valve configure to provide for eluent outflow of compounds separated from the crude mixture; and a hand-powered pressure bulb configured to provide low-pressure air flow into the shortwave UV transparent column attached to an inlet end of the quartz shortwave UV transparent column.

6 Claims, 2 Drawing Sheets

(56) References Cited

U.S. PATENT DOCUMENTS 4,550,594 A  *  11/1985  Engstrom  ............. B01D 15/24
                                                73/61.53
6,153,196 A  *  11/2000  Kripp  ...................... A61Q 5/12
                                                424/757
6,423,220 B1 *  7/2002  Fex  ........................ B01J 20/281
                                                210/659

* cited by examiner

LIVE-COLUMN VISUALIZATION CHROMATOGRAPHY FOR SEPARATION OF COMPOUNDS

BACKGROUND

Generally, chromatography is referred to as the separation of a mixture by passing it in solution or suspension through a medium in which the components move at different rates, due to interaction differences with the medium (i.e., sorbent).

Conventionally, mixed compounds get separated by difference in polarity when eluting down a column by solvents. The column may be packed by silica as the medium which is a polar material that grabs a stronger hold of polar molecules while letting the less polar molecules pass easier. So, when a solvent runs down the column, polar compounds move down slower, and vice versa. Also, since a polar solvent moves compounds down on a silica column faster than a non-polar solvent, a polar solvent (e.g., ethyl acetate) and a non-polar solvent (e.g., hexanes) solvent mix is used. The ratio of mixing may be adjusted by the worker during the separation process.

The polar and non-polar setup can be reversed as well, where the medium is non-polar (using C-18 silica) and polar compounds move down fastest, and where non-polar solvent elutes compounds fastest. This is common in HPLC (high-performance liquid chromatography), but could also be applied to a manual column.

However, all existing column chromatography systems for compound separation or purification suffer a major limitation, whether it is HPLC, Automated Flash LC, or manual column chromatography. The limitation is that compound(s) to be isolated can only be detected after the compound is eluted out, regardless of what method of detection is used—e.g., UV absorption, ELSD (evaporative light scattering detector), mass spectrometry, thin-layer chromatography (TLC) spotting, etc. The problems with detection after the compounds are eluted out is that:

1. There is no reliable information on when a certain compound will come out. One can only make an experienced guess;
2. More importantly, there is always a good chance that the compounds have not been separated well enough and come out as a mixture. However, being able to find out after the mixture has been eluted may be a bit too late and may indicate that the separation has not been successful. In this case, one will have to redo the separation all over, costing more labor, time and hazardous chemicals.

A single type of chromatography technique that avoids the above discussed problems may be used. The technique is referred to as preparative TLC where a thick layer (0.5-2 mm) of silica is premixed with a binding agent (gypsum and carboxymethyl cellulose sodium) is loaded onto a glass plate. The compound mixture is spotted as a band onto the beginning of the plate and eluted in the bottom to top direction, and compound bands on the plate are visualized live by UV light emitted from a UV source. After separation, compound bands need to be scraped off, with the compound washed off and filtered out of the silica. The silica also needs to have a fluorescence indicator mixed in it, to show a bright background upon UV light shining on it but be dark at regions where the UV is absorbed by compounds. While preparative TLC offers the possibility of live compound visualization, possible sample loading amount is minimum (<200 mg), and it involves a good amount of technician's time, specifically in the spotting stage and scraping, washing, filtering stages.

Accordingly, an efficient and inexpensive system for live compound visualization in a column chromatography setup for separation or purification of compounds from crude mixtures is desired.

SUMMARY OF THE INVENTION

Briefly summarized, disclosed herein are a system and method for efficient isolation of compounds from crude mixtures that allows a user to monitor the compounds as soon as the separation begins.

Disclosed herein is the system for live-column visualization chromatography for separation or purification of compounds including, in some embodiments, a quartz shortwave UV transparent column configured to receive a crude mixture to be separated and an eluting solvent; a sorbent homogenously premixed with an inorganic UV indicator, wherein the inorganic UV indicator is reusable after washing: a device configured to provide low-pressure air flow into the quartz shortwave UV transparent column attached to the inlet end of the quartz shortwave UV transparent column; a flow control valve attached to the outlet end of the quartz shortwave UV transparent column; and a nozzle attached to the flow control valve configured to provide for eluent outflow of compounds separated from the crude mixture.

These and other features of the concepts provided herein will become more apparent to those of skill in the art in view of the accompanying drawings and following description, which describe particular embodiments of such concepts in greater detail.

BRIEF DESCRIPTION OF DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings in which.

DETAILED DESCRIPTION

Figure 1:
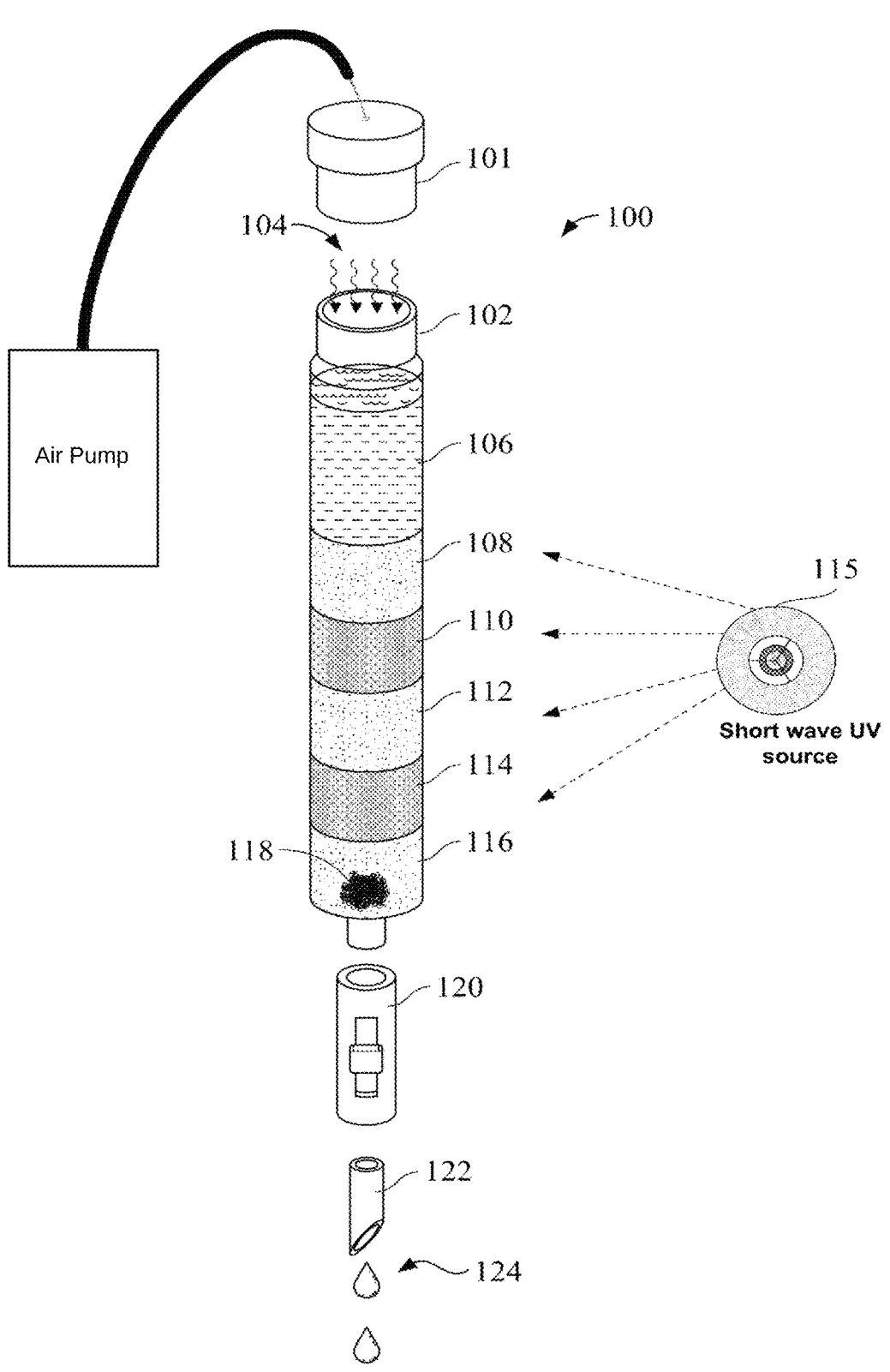
FIG. 1 provides a view of elements for assembly of a system for compound separation, in accordance with some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first,' second," and "third" features or steps need not necessarily appear in that order, and the particular embodiments including such features or steps need not necessarily be limited to the three features or steps. Labels, such as "right," "top," "bottom," "front," "back," and the like, are used for convenience and are not intended to imply, for example, any particular fixed location, orientation, or direction. Instead, such labels are used to reflect, for example, relative location, orientation, or directions. Singular forms of "a," an," and "the" include plural references unless the context clearly dictates otherwise.

Also, the words "including," "has," and "having," as used herein, including the claims, shall have the same meaning as the word "comprising."

Lastly, in the following description, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, components, functions, steps or acts are in some way inherently mutually exclusive.

Unless defined otherwise, all technical and scientific terms used herein have the same meaning as commonly understood by those of ordinary skill in the art.

Embodiments disclosed herein are directed to a system and method for compounds' separation from crude mixtures. According to the disclosed embodiments, a chromatography technique that avoids the above discussed problems may be used. The technique may include a preparative process where fluorescence UV indicator homogeneously premixed into extra fine silica (500-800 mesh) to high concentration, then mixed with larger particle size silica. The system employed for the process using the technique is discussed in details below. The separation/purification system, according to the exemplary embodiments, may be primarily used for separation of compounds from crude mixtures while allowing the user to monitor the compounds as soon as the separation begins.

Referring to FIG. 1, elements used for assembly of a system 100 for compound separation are shown.

The main part of an apparatus of the system 100 is a shortwave UV transparent quartz column 102 that at the bottom narrows into a tube which connects to a detachable flow control valve 120. A sorbent (e.g., silica) that is finely premixed with UV indicator is required in the quartz column 102. In one embodiment, the sorbent in this system can be reused. The bottom of the column may also have a frit (or cotton plug 118). The top of the quartz column 102 may have standard size joints, and near the top of the column there may be two hooks (not shown) configured to secure an extra solvent chamber or a device configured to provide air flow or gently pressurized air inlet 104 that may be attached to an aquarium pump. The eluting solvent 106 may fill up the entire column and come out (see 124). A UV source 115 may emit light onto the silica inside the column 102 during usage when live observation of compounds is performed. The fluorescence indicator may have an excitation wavelength anywhere between 200 nm to 395 nm. The specific excitation wavelength and UV source wavelength should fall within the absorption wavelength region of the compounds overlapping the silica in 110 and 114, which are to be isolated as needed. For wavelengths lower than 200 nm, the quartz column 102 may start blocking the UV rays coming from the source 115. Note that 254 nm is a most common wavelength. In one embodiment, the fluorescence UV indicator may be homogeneously premixed into extra fine silica (500-800 mesh) to high concentration, then mixed with larger particle size silica. Nozzle 122 may provide an eluent outflow 124 for recycle or compound collection.

To operate this system 100, UV-indicator included silica 108, 110, 112, 114 and 116 is first added into the quartz column 102. If the quartz column 102 does not have a frit, then a piece of cotton 118 may be used to block the tubing exit and avoid the silica from flowing out of the quartz column 102. The silica can be either dry loaded (faster) or wet loaded (more homogeneous silica packing, but requires slightly more effort). Then, a compound mixture to be separated (two compounds in the current example) may be added onto the top of the silica. Eluent solvent 106, 124 is washed down the quartz column 102, moving the compounds along. As the compounds move down the column at different rates, two bands of darkness 110 and 114 appear when UV from source 115 emits UV rays onto the column body. The bands are dark in contrast to the remaining bright background where there are no compounds to absorb UV and the UV indicator brightly fluoresces. One can expect each compound to come out as they are seen to be reaching the bottom of the quartz column 102. The solvent polarity can be increased or decreased accordingly based on the monitoring of the separation process. Purity can also be expected from observing the bands.

In one embodiment, the stop valve element 120 may be detachable or built-in. The detachable version allows easier cleaning and has a lower cost of manufacture. The ratio of fluorescence indicator mixed into the silica may be between 2.5-15%. More indicator may produce a brighter view. The fineness of the silica may be of any mesh, but high mesh values (finer particles) may not be used for long or thin columns, because it may be packed too tight for the solvent to move.

Figure 2:
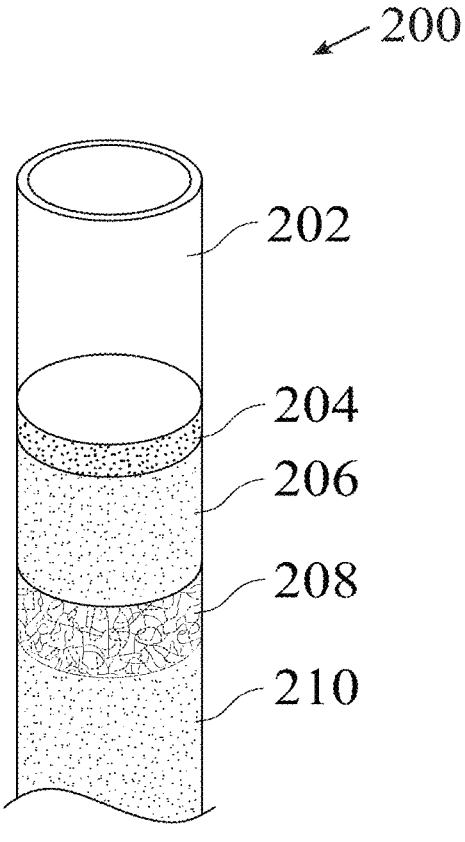
FIG. 2 provides a partial view of an assembly of the system for compound separation, in accordance with some embodiments.

FIG. 2 provides a view of an assembly of the portion of the compound separation system that better allows reuse of a packed column, in accordance with some embodiments.

The assembly 200 depicted in FIG. 2 shows a variation of the upper half of the quartz column 102 depicted in FIG. 1. The assembly 200 includes buffer silica layer 206 to be disposed after use, when sample contains highly polar components difficult to wash out. This sample 204 is placed on top of the buffer silica layer 206. Cotton layer 208 is positioned at the bottom of the buffer silica layer 206. Then, the main silica 210 for reuse is located below the cotton layer 208. Note that 210 is the same as 108, 112, 116 in FIG. 1.

As discussed above, the UV light is able to pass through the column walls due to advantageous use of the quartz glass to make chromatography columns. The passed through UV rays light up the UV indicator material finely mixed with common column chromatography silica. The entire column may be brightened except for the regions where the UV absorbing compound is located. Commercially available silica that contains UV indicator usually also contains binding agent (e.g., gypsum) that is needed to make TLC plates, but not ideal for column chromatography.

Preparing of the UV active silica may be implemented as follows.

Shortwave UV fluorescence indicator (e.g., manganese-doped zinc silicate) powder is added into extra fine silica of 500-800 mesh. The indicator should be able to absorb at the wavelength of the UV light source (usually 254 nm) to be used and emit in the visible light region as fluorescence. The 500-800 mesh silica may be too fine for column chromatography if directly used, but the solid UV indicator may need the extra fine silica to mix homogeneously (which is very important), and may not mix properly with larger particle size silica. Therefore, a 2-stage mixing is applied in total.

The mass ratio of indicator to fine silica (500-800 mesh) should be 1:3 or more. To achieve homogeneity, the mixing should be conducted in organic solvent first (e.g., hexanes) to form a suspension, and then the solvent should be fully evaporated by a rotovap. A 1:3 ratio gives 25% indicator by mass. Then, a good indicator ratio used in actual compound separation is 5%. A 1:4 solid mixing of the 25% indicator with silica of larger mesh size (anywhere from 100-400 mesh) will yield 5% indicator ratio. This powder mixing can now be done by simple shaking and will generate a very homogenous mix. The 5% provides for sufficient brightness in an unlighted fume hood. According to the disclosed embodiments, determining the polarity ranking of the compounds is implemented as follows.

Spotting on TLC would be the first step of the compound separation process. While experience passed down indicates to use an eluting solvent that gives the target compound for separation an Rf of 0.3 on the plate, performance between the plate and column can easily differ, because there are many variables-mainly how the plate is packed, and how the column is packed. What does not change is the polarity rank of the compounds. Therefore, when using the system Live-Column Visualization Chromatography for compound separation, after one obtains a relative polarity of compounds from TLC, one can start from a solvent polarity less than that of the TLC, and increase the polarity accordingly as the compounds are observed moving down.

Packing the column may be implemented as follows. To ensure sufficient quality of compound separation, the column should be well packed. In order to well-pack the column, wet-packing of the column is commonly performed—i.e., in a flask mixing silica with solvent into a slurry and pouring the slurry into the column. Before pouring, the bottom of the column should be gently blocked by a cotton plug when a frit is not built-in. While this technique of wet-packing is used commonly, it does suffer from inconvenience, that the residual silica slurry in the flask needs to be rinsed multiple times to be fully transferred into the column. A better alternative is dry-packing the silica, but with the assistance of a long stirring spatula. After the silica powder is poured into the column and fully wetted by solvent afterwards, the long stirring spatula should be used to agitate and stir up the silica and remove all air pockets resulting from dry-packing. This allows for a high-quality packing, without the hassle of pre-forming a slurry in a flask. The only extra accessory one needs is a long thin stirring spatula.

Loading of the compounds sample may be implemented as follows. The most convenient way of loading sample into the column is dissolving the sample in a minimum amount of non-polar solvent, and with a pipet evenly adding to the top of the silica. If dry-loading is used, the loading layer should be thin enough to allow good UV monitoring of the compounds in the column as they move down. After the compounds have fully entered the silica, the top of the silica should be covered with a cotton layer to prevent disturbing of the silica top when solvent is added into the column each time.

Running the column is implemented as follows. The same UV lamp already used in labs for viewing TLC plates is sufficient for Live-Column Visualization Chromatography.

Since the silica will glow green where there are no compounds covering it, the compounds will show up as dark bands among the green background. As solvent washes down the column, the bands will separate and be observed to gradually move down. To speed up the flow rate, gentle pressure should be applied, usually by a small home aquarium air pump. Starting from a low polarity solvent mix that can at least slowly move the least polar compound, this solvent can be constantly recycled until the first compound is seen to come out at the bottom (and collected). This also means only needing a minimum amount of the solvent. Once the first compound has finished eluting, the solvent polarity can be increased to make the next compound move down faster. The process is continued until all compounds, or the desired compound, has eluted down and is collected. Note that the number of compounds and the sequence they elute down the column are already determined by TLC before column running.

The proposed quartz column is capable of allowing UV of wavelengths down to 200 nm to pass through, therefore, Live-Column Visualization Chromatography is not limited to 254 nm viewing. To view with a shorter wavelength, however, the UV source needs to be more specialized, and the running solvent cannot significantly absorb UV at this shorter wavelength. E.g., acetone is mostly UV transparent around 210 nm, and if used as the eluting solvent allows viewing the compound at this shorter wavelength, but ethyl acetate will also absorb UV at this wavelength.

Potential reuse of a packed column may be implemented as follows. If there are no highly polar compounds, one can wash down a used column by polar solvent (e.g., ethyl acetate, acetone, isopropyl alcohol, etc.) until the entire column is clear of any dark bands or spots. The reuse saves not only material, but also time and labor of dumping the old silica and packing a new column. The reuse is practically possible only with the disclosed Live-Column Visualization Chromatography system, because otherwise one cannot have an assurance for when or if a column is fully cleaned. If there are highly polar remnants that are difficult to fully wash out, then a slightly different procedure can be used when first loading the sample as shown in FIG. 2.

As in the implementation depicted in FIG. 2, after packing the column, but before loading the sample, the cotton may be applied first. Then, add some more silica (3-6 cm) on top of the cotton to act as a buffer silica layer 206 and wet this buffer layer by solvent. Then, load the sample mix onto the top of the silica as would be normally done. After finishing the separation job, solvent in the buffer layer may be purged first, then a pair of long and narrow-tip forceps may be used to grab out in circular fashion the cotton 208, dragging out the entire buffer silica layer 206. This directly disposes of any unwashable polar components. The remaining column can be washed with polar solvent as described above.

According to the disclosed embodiments, users can now see their compounds as the compounds are running down the chromatography column, and not after they come out from the chromatography column. This, advantageously, provides precise information on when each and one of user's compounds will come out, how well the separation is going instead of guessing. This also allows the user to make adjustments to solvent polarity before the run is finished, instead of rerunning a failed separation with yet another round of experienced guesses.

Embodiments of the invention may be embodied in other specific forms without departing from the spirit of the present disclosure. The described embodiments are to be considered in all respects only as illustrative, not restrictive.

The scope of the embodiments is, therefore, indicated by the appended claims rather than by the foregoing description. All changes that come within the meaning and range of equivalency of the claims are to be embraced within their scope.

What is claimed is:

1. A system configured for live compound visualization in column chromatography separation of compounds, comprising:

a quartz shortwave UV transparent column defining a cavity therein, the quartz shortwave UV transparent column configured to receive:

a mixture of chemical compounds to be separated with an eluting solvent;

a sorbent that is homogenously premixed with an inorganic UV indicator, wherein the sorbent is washed in-place and reusable;

an air pump configured for providing air flow into an inlet end of the quartz shortwave UV transparent column;

a flow control valve attached to an outlet end of the quartz shortwave UV transparent column, wherein the flow control valve is removable from the outlet end of the quartz shortwave UV transparent column;

a nozzle attached to the flow control valve configured to provide for eluent outflow of compounds separated from a crude mixture; and a shortwave UV light source that satisfies the following regarding its wavelength: 1) creates fluorescence on the inorganic UV indicator, 2) does not get absorbed by the eluting solvent, and 3) gets absorbed by the crude mixture of chemical compounds.

2. The system of claim 1, comprising a buffer sorbent layer positioned above a cotton layer and a main sorbent layer, wherein the main sorbent layer is reusable, wherein the buffer layer is disposed of by dragging out the cotton layer.

3. A method of live compound visualization in column chromatography separation of compounds, comprising:

obtaining a system for live compound visualization in column chromatography separation of compounds, the system comprising:

a quartz shortwave UV transparent column defining a cavity therein configured to receive a crude mixture within the cavity to be separated with an eluting solvent;

an air pump configured for providing air flow an inlet end of the quartz shortwave UV transparent column;

a sorbent homogenously premixed with an inorganic UV indicator, wherein the sorbent is washed in-place and reused;

a detachable flow control valve, fitted to an outlet end of the quartz shortwave UV transparent column; and a nozzle attached to the detachable flow control valve configured to provide for eluent outflow of compounds separated from the crude mixture;

obtaining a relative polarity of the compounds from thin layer chromatography (TLC); and introducing the eluting solvent into the quartz shortwave UV transparent column cavity, wherein the polarity of the eluting solvent is sufficient to move a first compound, while recycling of the solvent until the first compound starts to exit the quartz shortwave UV transparent column cavity at the outlet end.

4. The method of claim 3, further comprising providing to the quartz shortwave UV transparent column a UV emission that matches the excitation wavelength of the indicator, that gets absorbed by the compounds, but does not get absorbed by the eluting solvent.

5. The method of claim 3, further comprising preparing the sorbent comprising silica by mixing a fluorescence UV indicator with fine silica of 500-800 mesh to homogeneity and with an indicator: fine silica ratio of 1:3 or higher, by an organic solvent and rotary evaporation, followed by solid mixing with larger particle size silica.

6. The method of claim 5, further comprising monitoring washing of the fluorescent UV indicator containing the sorbent for reuse by UV fluorescence for cleanliness.

* * * * *